US012752656B2

(12) United States Patent
Lin

(10) Patent No.: US 12,752,656 B2
(45) Date of Patent: *Oct. 6, 2026

(54) ELECTRIC VEHICLE CHARGING SYSTEM CAPABLE OF GENERATING ELECTRICITY BY SOLAR ENERGY

(71) Applicant: Meixia Zhong, Guangzhou (CN)

(72) Inventor: Haosheng Lin, Guangzhou (CN)

(73) Assignee: Meixia Zhong, Guangzhou (CN)

( * ) Notice: Subject to any disclaimer, the term of this patent is extended or adjusted under 35 U.S.C. 154(b) by 942 days.

This patent is subject to a terminal disclaimer.

(21) Appl. No.: 18/152,121

(22) Filed: Jan. 9, 2023

(65) Prior Publication Data

US 2023/0158914 A1 May 25, 2023

Related U.S. Application Data

(63) Continuation of application No. PCT/CN2021/105742, filed on Jul. 12, 2021.

(30) Foreign Application Priority Data

Jul. 19, 2020 (CN) ......................... 202010695005.6
Jul. 19, 2020 (CN) ......................... 202021419575.4

(51) Int. Cl.
*B60L 53/51* (2019.01)
*B60L 53/60* (2019.01)
(Continued)

(52) U.S. Cl.
CPC ............... *B60L 53/51* (2019.02); *B60L 53/60* (2019.02); *H02J 7/35* (2013.01); *H02J 7/80* (2026.01);
(Continued)

(58) Field of Classification Search
CPC ....................................................... B60L 53/51
See application file for complete search history.

(56) References Cited

U.S. PATENT DOCUMENTS 5,545,261 A * 8/1996 Ganz .......................... B60J 7/00
296/211
6,433,522 B1 * 8/2002 Siri ......................... H02J 1/102
323/272
(Continued)

FOREIGN PATENT DOCUMENTS

CN 201511838 U 6/2010
CN 102049997 A 5/2011
(Continued)

OTHER PUBLICATIONS

Internation Search Report of PCT/CN2021/105742, Mailed Oct. 14, 2021.

*Primary Examiner* — Tynese V Mcdaniel

(57) ABSTRACT

An electric vehicle charging system capable of generating electricity by solar energy comprises a fixed solar panel (1) fixed on a roof, a movable solar panel (2), a solar panel state control device (3) and an intelligent voltage conversion and control module (4). The solar panel state control device is connected to the intelligent voltage conversion and control module, and controls stretched and contracted states of the movable solar panel, output voltages of the solar panel fixed on the roof and the movable solar panel are connected in parallel, and then are connected to the intelligent voltage conversion and control module, and the intelligent voltage conversion and control module controls the solar panel to generate a maximum conversion rate and a maximum charging power under different light intensities in different time periods, realizes docking with the electric vehicle, and controls charging.

7 Claims, 13 Drawing Sheets

(51) Int. Cl.

| | |
|---|---|
| ***H02J 7/35*** | (2006.01) |
| ***H02J 7/80*** | (2026.01) |
| ***H02S 10/20*** | (2014.01) |
| ***H02S 10/40*** | (2014.01) |
| ***H02S 20/30*** | (2014.01) |

(52) U.S. Cl.

CPC .............. *H02S 10/20* (2014.12); *H02S 10/40* (2014.12); *H02S 20/30* (2014.12); *B60L 2210/10* (2013.01); *B60L 2210/42* (2013.01); *H02J 2207/20* (2020.01)

(56) References Cited

U.S. PATENT DOCUMENTS

| | | | | |
|---|---|---|---|---|
| 7,847,181 | B2 * | 12/2010 | Brescia | H02S 40/32 52/234 |
| 8,593,102 | B2 * | 11/2013 | McGuire | F24S 25/33 60/641.15 |
| 8,729,445 | B2 * | 5/2014 | Kelly | H02J 7/35 250/203.4 |
| 11,881,807 | B1 * | 1/2024 | Elsinawi | H02S 20/30 |
| 12,218,623 | B1 * | 2/2025 | Rosen | F24S 25/12 |
| 2006/0225781 | A1 * | 10/2006 | Locher | H10F 19/00 257/E31.11 |
| 2008/0100258 | A1 * | 5/2008 | Ward | H01M 10/465 320/101 |
| 2010/0043781 | A1 * | 2/2010 | Jones | F24S 25/16 126/704 |
| 2010/0084208 | A1 * | 4/2010 | Chen | B60L 58/34 320/101 |
| 2012/0098350 | A1 * | 4/2012 | Campanella | H04B 5/26 307/104 |
| 2012/0136534 | A1 * | 5/2012 | Walsh | H10F 19/902 701/36 |
| 2013/0305528 | A1 * | 11/2013 | Anderson | H02S 40/34 29/825 |
| 2014/0358342 | A1 * | 12/2014 | Marks | B60L 8/003 180/2.2 |
| 2015/0001932 | A1 * | 1/2015 | Inoue | H02J 7/35 307/24 |
| 2017/0038417 | A1 * | 2/2017 | Nakagawa | G07C 5/008 |
| 2017/0057367 | A1 * | 3/2017 | Paryani | H02S 20/30 |
| 2017/0063290 | A1 * | 3/2017 | Kurlagunda | B60L 8/003 |
| 2017/0310272 | A1 * | 10/2017 | Julian | H02S 20/00 |
| 2017/0324367 | A1 * | 11/2017 | Collins | H02S 30/20 |
| 2018/0212551 | A1 * | 7/2018 | Polk | H02S 20/32 |
| 2022/0396167 | A1 * | 12/2022 | Sharifipour | B60L 53/51 |
| 2023/0158893 | A1 * | 5/2023 | Lin | B60L 8/003 320/104 |
| 2023/0158914 | A1 * | 5/2023 | Lin | H02J 7/35 320/101 |
| 2024/0388120 | A1 * | 11/2024 | Hjelmaker | H02S 10/40 |
| 2024/0401838 | A1 * | 12/2024 | Stocker | F24F 11/65 |
| 2025/0079879 | A1 * | 3/2025 | Murakami | H02S 50/10 |
| 2025/0167725 | A1 * | 5/2025 | Scrofani | H02S 10/40 |
| 2025/0239850 | A1 * | 7/2025 | Danesh-Bahreini | H02J 3/001 |
| 2025/0299607 | A1 * | 9/2025 | Twiss | H02J 3/46 |
| 2025/0303878 | A1 * | 10/2025 | Murakami | B60L 8/003 |
| 2025/0385640 | A1 * | 12/2025 | Verma | H02S 30/10 |

FOREIGN PATENT DOCUMENTS

| | | | |
|---|---|---|---|
| CN | 104723890 | A | 6/2015 |
| CN | 205930263 | U | 2/2017 |
| CN | 206510768 | U | 9/2017 |
| CN | 107640037 | A | 1/2018 |
| CN | 208149091 | U | 11/2018 |
| CN | 109591612 | A | 4/2019 |
| CN | 110293849 | A | 10/2019 |
| CN | 213383888 | U | 6/2021 |
| CN | 213534454 | U | 6/2021 |
| JP | 2013255405 | A | 12/2013 |
| KR | 20190005365 | A | 1/2019 |

* cited by examiner

ELECTRIC VEHICLE CHARGING SYSTEM CAPABLE OF GENERATING ELECTRICITY BY SOLAR ENERGY

This application is a continuation of International Patent Application No. PCT/CN2021/105742 with a filing date of Jul. 12, 2021, designating the United States, now pending, and further claims priority to Chinese Patent Application No. 202010695005.6 with a filing date of Jul. 19, 2020, Chinese Patent Application No. 202021419575.4 with a filing date of Jul. 19, 2020. The content of the aforementioned applications, including any intervening amendments thereto, are incorporated herein by reference.

TECHNICAL FIELD

The present invention belongs to the technical field of electric vehicle or hybrid electric vehicle charging, and more particularly relates to a charging system capable of generating electricity by solar energy and efficiently and practically assisting in charging an electric vehicle and a control method.

BACKGROUND OF THE PRESENT INVENTION

With the enhancement of social awareness of environmental protection and some obvious advantages of electric vehicles, the number of electric vehicles used is increasing rapidly, but there are still great troubles in the charging aspect of the electric vehicles. On one hand, there are a small number of charging stations, and most of the charging stations are not arranged by the roadside. On the other hand, it takes a long waiting time to charge at the charging station every time. Secondly, due to a large current and a large load while charging, one charging station has a great load impact on the national power grid, and causes a great damage to a power battery at the same time. The charging of the electric vehicle is relatively troublesome, and many charging problems have not been completely solved. Particularly, parking spaces of many families are failed to be provided with charging piles due to the large charging current and the large load, and there are a fewer number of charging stations in some places, but it is often necessary to plug and charge the electric vehicle, so that it is relatively troublesome to use, which has always troubled consumers and the use convenience of the vehicle, thus limiting the popularization of the electric vehicle.

In addition, there are many shortcomings in the existing solar charging system design, such as a small electricity generation area, or a lack of control, a low conversion rate, a small electricity generation capacity, or inability to dock with an actual electric vehicle, inability to charge a battery of the actual electric vehicle, a lack of practicality, and inability to be applied and popularized in actual life consumption, and the details are as follows.

1. In most solar charging systems, solar panels are limited by vehicle body areas, so the total electricity generation areas of the solar panels are small, and the electricity generation capacity is relatively small theoretically. In addition, in some related solutions of enlarging the solar panel, there is a lack of a state control device of the solar panel capable of being applied in practice, and the enlarged solar panel affects the appearance or normal running of the vehicle, which lacks the feasibility for actual manufacturing or mounting. Especially for an electric vehicle with a small roof area, the electricity generation area of the solar panel is smaller fundamentally, which limits a potential electric power generated by the solar panel, and makes the electricity generation capacity and the charging capacity by the solar energy small fundamentally.

2. In the design of other solar systems, the area of the solar panel is increased, but is not specified to an electricity generation characteristic of the solar panel, which lacks voltage conversion and maximum power computing control, and is failed to effectively control the solar panel to be in a maximum power electricity generation state, resulting in serious reduction of the conversion efficiency and the electricity generation capacity, significantly reduced electricity generation power, and a poor electricity generation effect, which are very serious problems and key shortcomings leading to a situation that the charging capacity cannot meet actual application requirements.

3. When the electricity generated by the solar panel or the converted voltage cannot be used to directly charge the power battery, the previous solar charging solutions lacks handshake communication or lacks a docking control function, cannot dock and charge the actual vehicle, cannot solve the practical use problem of solar charging, and is failed to be applied to actual charging.

4. In addition, the electric vehicles require very high charging requirements and safety levels. In a charging application of the electric vehicles with extremely high safety, there is a lack of an independent voltage detection and monitoring process in an extra solar charging solution in the past, which was easy to cause a damage to the battery due to overcharging, or cause a safety problem of the battery.

The above shortcomings have become the bottlenecks of applying the solar electricity generation charging to assist in charging the actual electric vehicle, resulting in the failure to popularize solar auxiliary charging. To comprehensively solve the above shortcomings, to urgently rectify and integrate the solutions has become an urgent problem to be comprehensively solved.

SUMMARY OF PRESENT INVENTION

The present invention aims to overcome the above shortcomings and solve the above technical problems, so as to solve and integrate the existing problems and shortcomings by complete and practical design. By adding a movable solar panel, a control device, and an intelligent voltage conversion and control module above a roof, an electricity generation area of a charging system of the present invention is increased, and a beautiful appearance and a shape during driving of the vehicle are kept, so as to make manufacturing or mounting feasible, and it is capable of controlling to generate maximum conversion rate and electricity generation capacity in real time, so as to make the generated electricity generation capacity near daily electricity consumption of the electric vehicle, thus reaching a practical use level of the charging capacity, and reducing a number of charging cycles of a vehicle owner. A charging controller is added, so that the charging can be docked with an actual common vehicle, and the solar charging is safer during practical application. A temperature of a vehicle body cannot be greatly reduced in hot weather when the vehicle body is exposed to the sun. The solar panel can be automatically folded during driving to recover an original shape of the vehicle body, so that the beautiful appearance and normal driving of the vehicle body are not affected, and the whole charging system reaches an actual daily practical use level, which lays a foundation for popularization, thus saving high power charging, effectively avoiding a huge burden on a power grid, facilitating charging of the electric vehicle, and being conducive to promoting green charging.

In order to solve the above problems in the background art, and realize the system of the present invention, the technical solutions of the present invention are as follows.

An electric vehicle charging system capable of generating electricity by solar energy comprises a fixed solar panel, a movable solar panel, a solar panel state control device, and an intelligent voltage conversion and control module, wherein the fixed solar panel is fixedly mounted on a roof, the movable solar panel is mounted on two sides of the fixed solar panel, and the solar panel state control device is connected to the intelligent voltage conversion and control module, is used for receiving a vehicle-mounted signal and a signal of the intelligent voltage conversion and control module, and controls a stretched or contracted state of the movable solar panel, output voltages of the fixed solar panel and the movable solar panel are connected in parallel, and the output voltage obtained by the parallel connection is connected to the intelligent voltage conversion and control module, a voltage output terminal of the intelligent voltage conversion and control module is connected to a charging port of the electric vehicle or a power battery of the electric vehicle, and the intelligent voltage conversion and control module is used for controlling the solar panel to generate a maximum conversion rate and a maximum charging power under different light intensities in different time periods, is docked with the electric vehicle and controls charging, and monitors a charging process; the intelligent voltage conversion and control module comprises a MCU intelligent computing controller, a current inductor, a voltage value detection circuit, a voltage converter and a charging controller, the current inductor and the voltage value detection circuit respectively detect a charging current and a charging voltage, and are connected to the MCU intelligent computing controller, the MCU intelligent computing controller is connected to the voltage converter, an output of the voltage converter is linked with the charging controller, and the MCU intelligent computing controller controls the voltage converter to convert and generate different voltages under the same light intensity in the same time period, calculates and memorizes different charging powers and parameters according to a voltage and a current passed pack, selects a parameter corresponding to the maximum power to control an output voltage of the voltage converter, and charges the electric vehicle through the charging controller.

The voltage converter is a controllable DC/DC voltage converter or DC/AC voltage converter, is controlled by the MCU intelligent computing controller, and is capable of outputting a continuously adjustable voltage.

The charging controller is a charging controller having handshake communication and control functions according to an interface standard of an original vehicle charging socket, an input terminal of the charging controller is connected to an output terminal of the voltage converter, and an output terminal of the charging controller is connected to an original DC charging port 51 of the electric vehicle, or is connected to a cathode or an anode of a power battery 53, or is connected to an AC charging port 54 of the electric vehicle to charge the electric vehicle; and the charging controller is also connected to the MCU intelligent computing controller, and the MCU intelligent computing controller controls the charging controller to start or stop charging.

The solar panel state control device comprises a driving structure driving the movable solar panel to stretch, contract and translate, a driving control module and a low-voltage 12-v rechargeable battery, the driving structure is connected to the driving control module, and the driving structure is mounted at a bottom portion of the fixed solar panel. The 12-v rechargeable battery is connected to the driving control module and the intelligent voltage conversion and control module respectively, and provides a power supply needed for working.

The driving control module comprises a vehicle-mounted signal input unit, a MCU controller and a motor controller, the MCU controller is connected to the vehicle-mounted signal input unit, and is used for receiving a signal instruction of the vehicle related to charging, the MCU controller is connected to the MCU intelligent computing controller, and is used for receiving charging state information, and the motor controller is connected to the MCU controller and the driving structure respectively.

The driving structure 31 comprises a motor provided with a gear, a trunking guide rail and a transmission rack, the transmission rack is fixed below the movable solar panel 2, the driving motor is mounted at two ends of the fixed solar panel, and is meshed with the transmission rack through the gear, and the motor rotates to drive the movable solar panel 2 to translate along the trunking guide rail.

The movable solar panel 2 is divided into a front part and a rear part, each part is composed of a single-layer or multi-layer solar panel, and has a single-layer structure or a multi-layer superimposed structure, and voltage output terminals of the fixed solar panel and the movable solar panel are respectively connected with a diode in series to prevent a current from flowing backwardly.

The solar panel state control device may be further added with a telescopic supporting rod, one end of the telescopic supporting rod is fixed on the roof, the other end of the telescopic supporting rod is hinged with a bottom portion of the fixed solar panel, three telescopic supporting rods are provided, and are respectively connected to the motor controller, the motor controller changes a height of a supporting point of the solar panel, and changes a planar angle of the solar panel by controlling the supporting rod to stretch and contract, so that the solar panel is nearly perpendicular to a solar ray.

Compared with the prior art, the present invention has the beneficial effects as follows.

Firstly, by adding the extendable and movable solar panel on the basis of the fixed solar panel, when the vehicle is not in use and the conditions are met, the solar panel state control device is added, and the solar panel area is expanded on a limited vehicle body area, so that the electricity generation area of the solar panel is increased fundamentally; when the vehicle is in use, the movable solar panel is accommodated and stored by the solar panel state control device, so that the solar panels overlap and the total area is reduced, so that the original aesthetics and the appearance of the vehicle can be roughly maintained, and the rapid running of the vehicle is not affected.

On the other hand, in view of the maximum conversion rate of the solar panel, by adding the intelligent voltage conversion and control module and calculating by the MCU, the maximum power parameter can be calculated under different light intensities, so that the solar panel can output the maximum power, and the maximum conversion rate and total power generation can be obtained; and the converted maximum electricity generation power can be used to charge the electric vehicle in real time through the charging controller.

Meanwhile, through the charging controller having the handshake signal communication protocol function in the intelligent voltage conversion and control module, the electric energy can be docked and charged to a charging circuit of an actual electric vehicle.

In addition, the intelligent voltage conversion and control module monitors the charging voltage in real time, and ensures the charging safety when the electricity generation voltage of the solar panel and the voltage of the electric vehicle vary greatly.

To sum up the above effects, the solar charging system of the present invention can expand the total electricity generation area of the solar panel and increase the total electricity generation capacity fundamentally, further control the real-time output maximum conversion rate and the maximum charging power, and realize the docking and charging of the electric vehicle. When the vehicle is in use, the total solar panel area is reduced, which roughly maintains the appearance and shape of the vehicle during driving, reduces the wind resistance, and does not affect the normal driving. The present invention solves four shortcomings in the background art at the same time, and enables solar energy charging to meet the practical requirements and practical level of daily charging. Moreover, the extended solar panel can block solar rays, effectively cool the vehicle body and prevent heat transfer to the vehicle body.

DETAILED DESCRIPTION OF PREFERRED EMBODIMENTS

Figure 1:
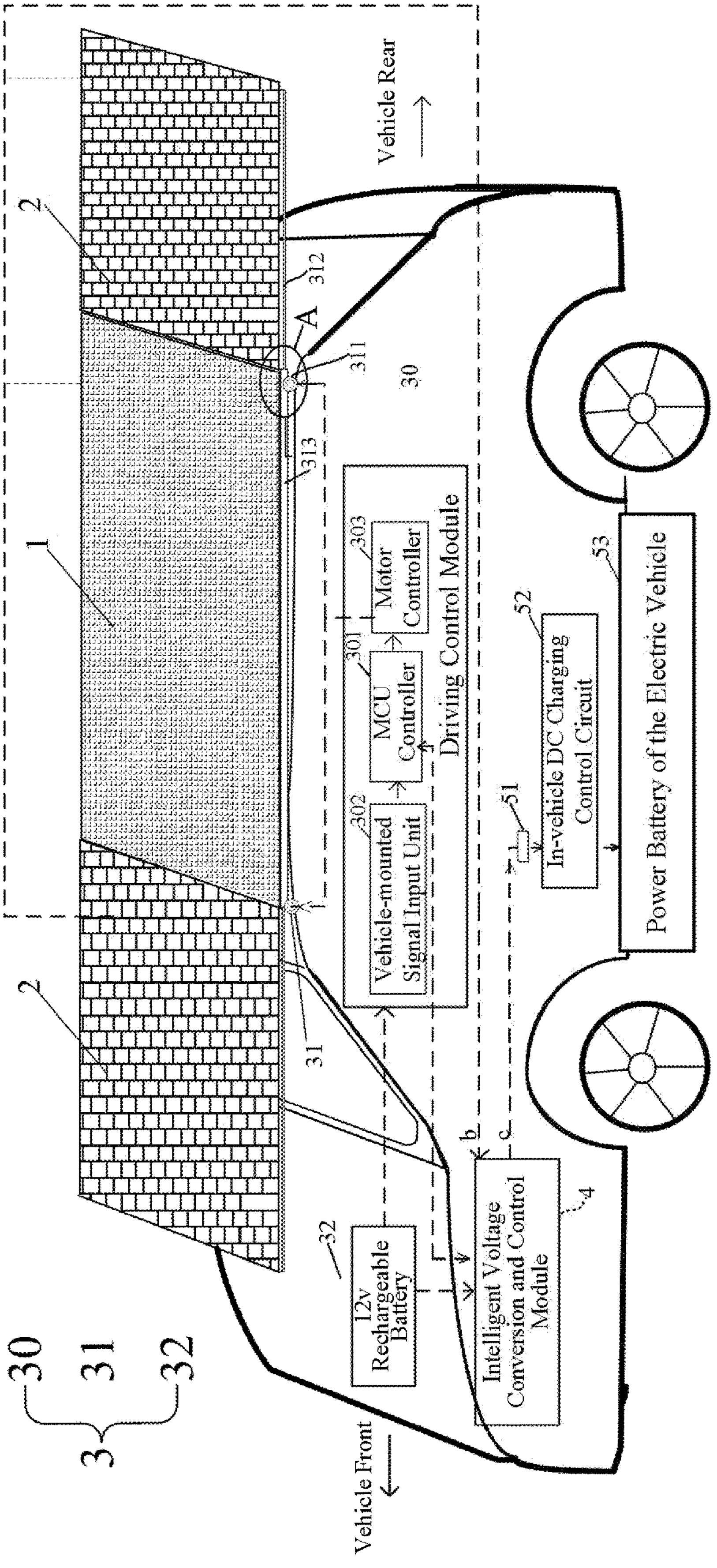
FIG. 1 is a schematic structural diagram of a first embodiment of the present invention.

To make the objects, technical solutions, and advantages of the present invention clearer, the present invention will be further described hereinafter with reference to the accompanying drawings and embodiments.

As shown in FIG. 1, FIG. 2, FIG. 7, FIG. 9, FIG. 10 and FIG. 11, an electric vehicle charging system capable of generating electricity by solar energy according to a first embodiment of the present invention is provided, which comprises a fixed solar panel 1 fixed on a roof, a stretchable and retractable movable solar panel 2, a solar panel state control device 3, and an intelligent voltage conversion and control module 4. The fixed solar panel 1 is fixedly mounted on the roof, and the movable solar panel 2 is mounted on two sides of the fixed solar panel. The solar panel state control device 3 is connected to the intelligent voltage conversion and control module 4, is used for receiving a vehicle-mounted signal and a signal of the intelligent voltage conversion and control module 4, and controls a stretched or contracted state of the movable solar panel 2. Output voltages of the fixed solar panel 1 and the movable solar panel 2 are connected in parallel, and the output voltage obtained by the parallel connection is connected to a voltage converter 44 in the intelligent voltage conversion and control module 4. A voltage output terminal b of the intelligent voltage conversion and control module 4 is connected to a DC charging port of the electric vehicle. The intelligent voltage conversion and control module 4 is used for converting an output voltage of the solar panel into a voltage for charging a power battery under different light intensities in different time periods, and controlling the solar panel to generate a maximum conversion rate and a maximum charging power in real time, is docked with the electric vehicle and controls charging, and monitors a charging process.

With the above structure, a state of the movable solar panel 2 is controlled by the solar panel state control device 3, which can be used to expand a total illumination area of the solar panel. When the electric vehicle is not running, the intelligent voltage conversion and control module 4 calculates a maximum electricity generation power according to the timing, so as to intelligently judge light intensity information, and meanwhile, combined with a voltage of the power battery detected, comprehensive state information is sent to the MCU controller of the solar panel state control device. After receiving the information, the MCU controller comprehensively judges whether to extend the movable solar panel by combining vehicle state information transmitted by an on-vehicle information input unit. In case of illumination, when the vehicle is not running and the battery is not fully charged, the movable solar panel is controlled to extend to front and rear sides of the vehicle, expanding the illumination area, so as to increase the electricity generation area fundamentally and provide necessary basic conditions for charging to reach a practical level. When driving, the solar panel is retracted. In addition, on the basis of increasing the electricity generation area of the solar panel, the conversion rate and output power of the solar panel under the same illumination condition in a certain time period are greatly affected by the load, but not fixed. According to this characteristic, the present invention additionally comprises the intelligent voltage conversion and control module, which can control the solar panel to generate the maximum conversion rate and maximum charging power in real time under various light intensities in each time period set, so that the solar panel with the increased area can be excited and controlled in each time period to emit maximized electric energy, and make the charging further reach the practical level. Meanwhile, through the charging controller comprised in the intelligent voltage conversion and control module 4, the present invention realizes docking with the electric vehicle to charge the power battery 53, so that the electricity generation capacity and charging capacity are close to the daily electricity consumption of the vehicle. In actual production, the solar panel state control device and the intelligent voltage conversion and control module are mounted at a bottom portion of the fixed solar panel or under a front cover of the vehicle.

The present invention can enlarge the illumination area of the solar panel, control the solar panel to be in the state of maximum conversion rate and maximum electricity generation power, realize the effective connection with the electric vehicle, realize the maximum charging power to charge the power battery, make the charging capacity close to the daily electricity consumption, reach the practical level, and can contract the solar panel when using the vehicle, so as to keep the original shape of the vehicle to a great extent and keep the aesthetics.

Figure 2:
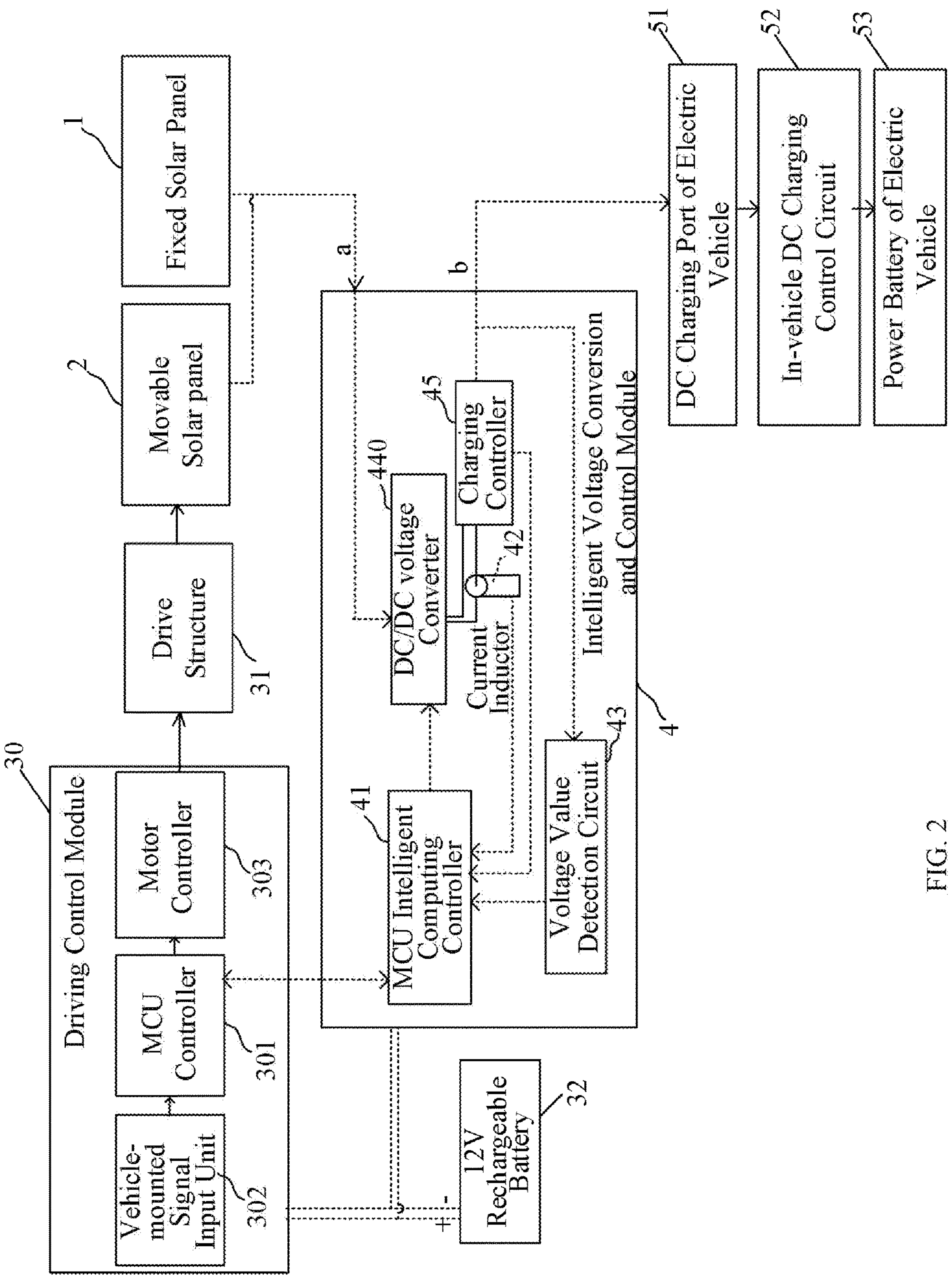
FIG. 2 is a principle topology schematic diagram of the first embodiment of the present invention.

Each structural part of the present invention will be described in detail hereinafter with reference to the first embodiment and the corresponding drawings, and the details are as follows: as shown in FIG. 1 and FIG. 2, in the embodiment of the electric vehicle charging system capable of generating electricity by solar energy, the solar panel state control device 3 comprises a driving structure 31 driving the movable solar panel to stretch, contract and translate, a driving control module 30 and a low-voltage 12-v rechargeable battery 32. The driving structure 31 is connected to the driving control module 30, and the driving structure 31 is mounted at a bottom portion of the fixed solar panel. The 12-v rechargeable battery 32 is connected to the driving control module 30 and the intelligent voltage conversion and control module 4 respectively, and provides a power supply needed for working.

With the above structure, the solar panel state control device 3 of the present invention controls the driving structure 31 through the internal driving control module 30, so that the driving structure drives the movable solar panel 2 to translate and extend, expanding the illumination area of the solar panel. During driving, the movable solar panel 2 is driven to be retracted and hidden under the fixed solar panel 1, so that the sightseeing shape and aesthetics of the vehicle are kept, and the normal use of the vehicle is not affected.

As shown in FIG. 1, in the electric vehicle charging system capable of generating electricity by solar energy, the driving structure 31 comprises a motor 311 provided with a gear, a trunking guide rail 313 and a transmission rack 312. The movable solar panel 2 is divided into a left part and a right part, as shown in the enlarged drawing of FIG. 7. The movable solar panel is a single-layer movable solar panel, and the trunking guide rail is mounted on both sides of the fixed solar panel. The transmission rack 312 is fixed below the next movable solar panel 2, and the motor 311 is mounted at two ends of the fixed solar panel 1, and is meshed with the transmission rack 312 through the gear 316. The motor rotates to drive the movable solar panel 2 to translate along the trunking guide rail 313, and drive the left and right movable solar panels to extend or contract back and forth to the vehicle.

With the above structure, the gear can be rotated by the driving motor of the present invention so as to drive the transmission rack 312, so that the driving structure 31 can drive the movable solar panel 2 to translate and expand, and the driving control module 30 can control an expansion state of the movable solar panel 2.

Figure 8:
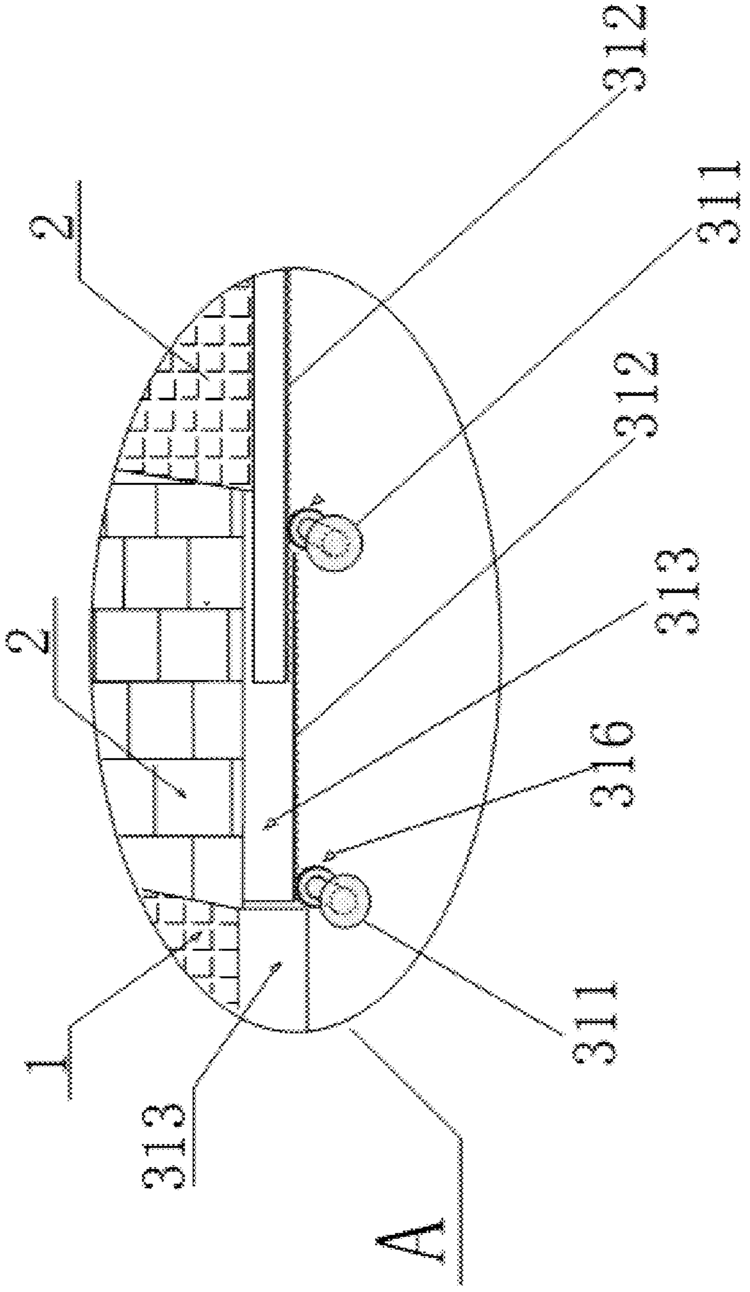

In the actual production process, the movable solar panel is composed of a single-layer or multi-layer movable solar panel, as shown in the enlarged drawing of FIG. 8. The left and right movable solar panels may be expanded to be composed of multi-layer movable solar panels, adopting a multi-layer superimposed structure. The trunking guide rail is mounted on both sides of each solar panel. The trunking guide rail of next solar panel is embedded in the trunking guide rail of the previous solar panel. One end of the outer movable solar panel is fixed on the inner movable solar panel. When the motor is fixed at two ends of each trunking guide rail, and when the motor rotates, the gear drives the transmission rack, thereby driving the movable solar panel of next layer to translate.

In the electric vehicle charging system capable of generating electricity by solar energy as shown in the topology diagram of FIG. 2, the driving control module 30 comprises a vehicle-mounted signal input unit 302, a MCU controller 301, and a motor controller 303. The MCU controller 301 is connected to the vehicle-mounted signal input unit 302, and is used for receiving a signal instruction of the vehicle related to charging. The MCU controller 301 is connected to the MCU intelligent computing controller 41, and is used for receiving charging state information. The motor controller 303 is connected to the MCU controller 301 and the driving structure 31 respectively. The MCU controller 301 receives the state information of the vehicle and artificial control information through the vehicle-mounted signal input unit 302, and comprehensively and intelligently judges whether to extend the movable solar panel according to the state of the vehicle, an artificial instruction, a light intensity and a battery voltage state by combining information containing the charging state transmitted by the MCU intelligent computing controller 41. When the conditions are met and the solar panel area needs to be expanded, the MCU controller 301 controls the motor controller 303 to control the motor in the driving structure to rotate, so as to drive the movable solar panel 2 to move forward and backward to expand the illumination area. When the vehicle needs to be used, or when it is required to fold the movable solar panel artificially, or when an external environment has poor illumination conditions, the movable solar panel 2 will be automatically retracted and hidden under the fixed solar panel 1. In this case, the fixed solar panel 1 can still receive illumination to generate electricity and continue to charge the power battery during the driving process. In actual use, a control mode or instruction information may be given artificially through a switch or a remote control, and transmitted to the MCU controller 301 through the vehicle-mounted signal input unit, so that the state of the solar panel can be forcibly controlled in a specific occasion or before the vehicle is used. In practical application, the vehicle-mounted signal input unit may comprise a wireless transceiver module, which is used for receiving remote control signals or mobile phone monitoring signals, and send all charging information to a remote control terminal.

In actual production, the 12-v rechargeable battery may be an original low-voltage 12-v rechargeable battery of the vehicle, or may be an independent 12-v maintenance-free lead-acid battery. The battery is placed under the roof capable of generating electricity. While the intelligent voltage conversion and control module 4 charges the power battery, an output voltage of 14 v is also output through the internal voltage converter 44 to charge the 12-v rechargeable battery 32. Alternatively, in actual production, a switching power supply may also be used to take electricity from a cathode and/or an anode of the power battery, reduce the high voltage to a 12-v power supply, and then supply electricity to the driving control module 30, and supply electricity to the intelligent voltage conversion and control module to provide the power supply needed for working.

In actual production and application, voltage output terminals of the solar panels are connected in series with a diode to prevent a current from flowing backwardly. The MCU controller 31 of the solar panel state control device 3 intelligently controls the state of the movable solar panel according to signal requirements of the vehicle-mounted signal input unit, a light intensity signal transmitted by the intelligent voltage conversion and control module, and a plurality of factors or instruction requirements such as that whether the power battery voltage is fully charged. In actual use, by giving instruction requirements to the vehicle-mounted signal input unit, it is possible to manually control the expansion or non-expansion of the solar panel, and to choose to control the expansion of the movable solar panels on two sides or choose to only expand the solar panels on one side.

The specific embodiments above illustrate how the solar panel state control device can flexibly and effectively expand the solar panel area on a limited vehicle body area, so as to increase the electricity generation area fundamentally. On the other hand, according to the characteristics of the solar panel, the output power of the solar panel that already expands the total area will be greatly changed by the load under the same area and the same light intensity, and the output power is not a fixed output power. Therefore, through intelligent control of voltage conversion and intelligent calculation, finding a maximum power point, controlling a real-time output according to the maximum power, and adding the corresponding charging controller to dock with a charging control circuit of the electric vehicle, so as to realize the safe charging, are the other two important factors for the charging to reach the practical level. The specific implementation modes are as follows.

In the electric vehicle charging system capable of generating electricity by solar energy as shown in the topology diagram of FIG. 2, the intelligent voltage conversion and control module 4 comprises a MCU intelligent computing controller 41, a current inductor 42, a voltage value detection circuit 43, a voltage converter 44 and a charging controller 45. The current inductor 42 and the voltage value detection circuit 43 respectively detect a charging current and a charging voltage, and are connected to the MCU intelligent computing controller 41. The MCU intelligent computing controller 41 is connected to the voltage converter 44, and an output of the voltage converter 44 is linked with the charging controller 45. The MCU intelligent computing controller 41 controls the voltage converter 44 to convert and generate different voltages under the same light intensity in the same time period, detects different charging currents and charging voltages through the current inductor and the voltage value detection circuit, calculates and memorizes different charging powers according to a calculation formula that the power P=U*I, and selects a voltage conversion parameter corresponding to the maximum power to output a charging voltage, charges the power battery 53 of the electric vehicle through the charging controller 45, and controls in real time to obtain the maximum conversion rate and the maximum charging power under the same light intensity in each time period.

With the above structure, the intelligent voltage conversion and control module 4 can calculate the strongest electricity generation power in a certain time period, so as to judge the light intensity and send a light intensity signal to the solar panel state control device 3, and on other hand, can control the internal voltage converter 44 in real time, calculate and memorize different parameters to obtain the actual charging power, find and select the parameter corresponding to the maximum power, and control the voltage converter 44 to convert and output a voltage corresponding to the maximum charging power, so as to excite and control the solar panel to be in an output state with the maximum electricity generation power.

Figure 11:
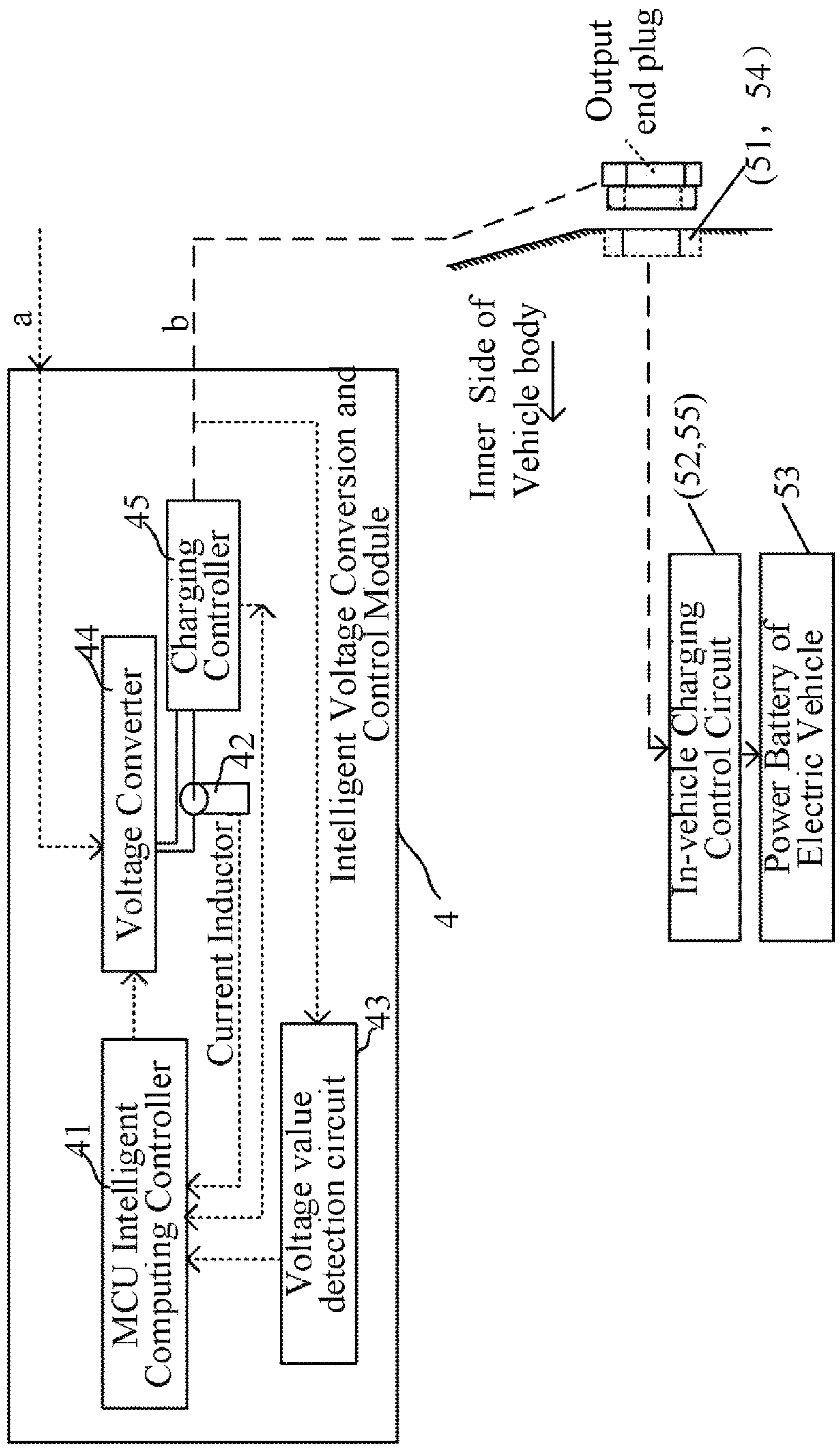
FIG. 11, FIG. 12 and FIG. 13 are three schematic structural diagrams of the connection between a charging controller and a charging port of an electric vehicle.
Figure 12:
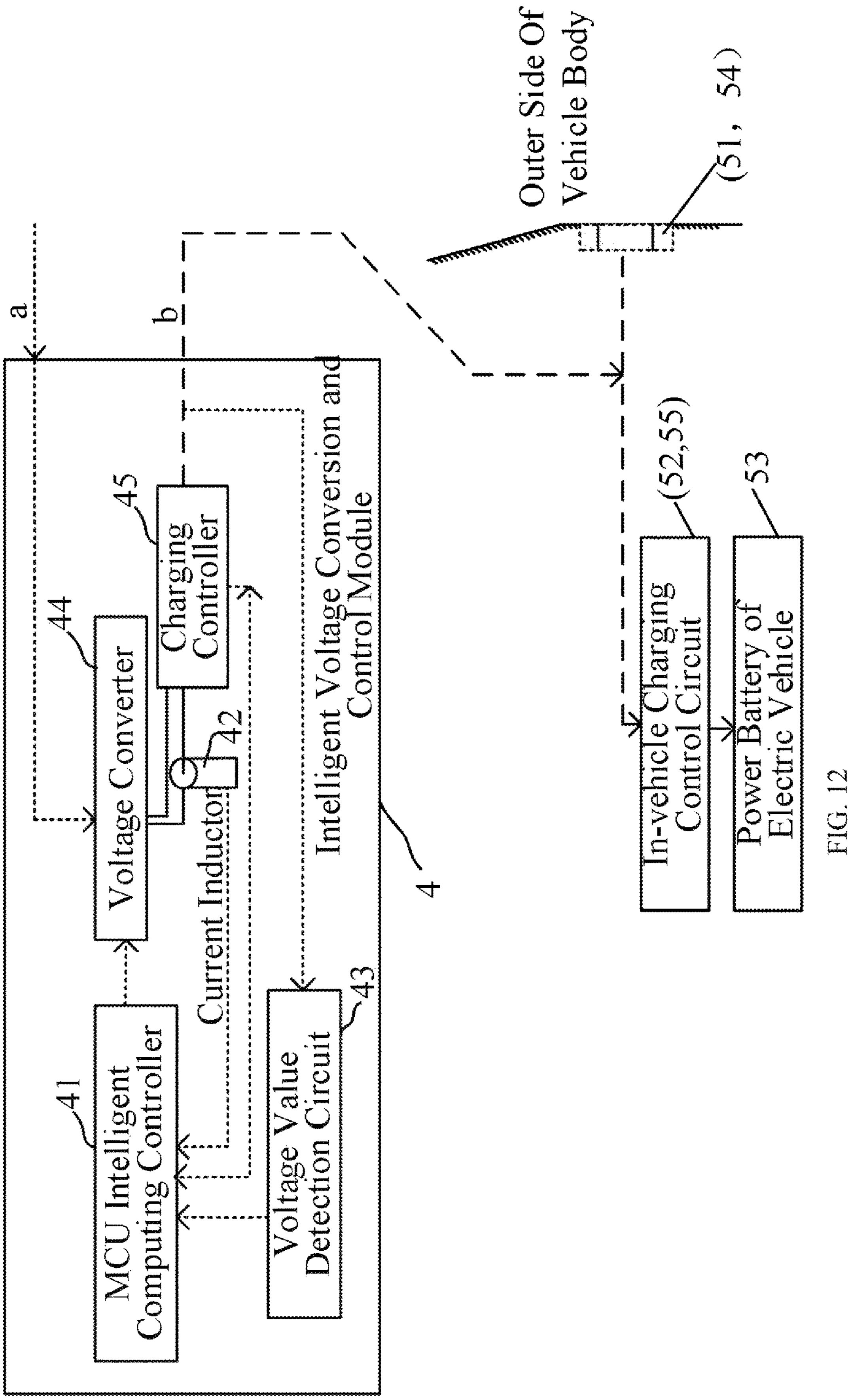

In the electric vehicle charging system capable of generating electricity by solar energy as shown in the topology diagram of FIG. 2, the voltage converter 44 is a DC/DC voltage converter 440, which is a voltage converter controlled by the MCU intelligent computing controller 41, and is capable of outputting a continuously adjustable voltage. The charging controller 45 is a charging controller having handshake communication and control functions according to an interface standard of an original vehicle DC charging socket. The charging controller 45 is connected to the voltage converter 44, and an output terminal b of the charging controller 45 is used as a voltage output terminal b of the intelligent voltage conversion and control module 4. As shown in the structure of FIG. 2, the output terminal b is connected to an original DC charging port 51 of the electric vehicle to charge the electric vehicle. According to the principle structure of the first embodiment of the present invention, a controllable and adjustable DC/DC voltage converter 440 is used in the voltage converter, and a voltage output by the voltage converter 440 enters the charging controller 45. The charging controller 45 comprises the handshake communication and control functions according to the original vehicle DC charging interface standard. The output terminal b of the charging controller 45 is connected with the DC charging port 51 of the electric vehicle through the following connection way. Preferably, as shown in FIG. 11, the tail end of the output terminal b is plugged into the charging port of the vehicle body by using a plug, or alternatively, as shown in FIG. 12, the output terminal b is connected to a rear end line of the charging socket. In actual production and application, or as further shown in FIG. 13, at an initial design stage of the vehicle, the charging socket is derived from a sub-charging access port built into a in-vehicle charging control circuit, and the output terminal b is connected to the sub-charging access port, thus being connected to an in-vehicle DC charging control circuit module 52 and integrated into a whole. In all the above ways, the output voltage of the charging controller 45 can charge the power battery of the electric vehicle through the in-vehicle charging control circuit.

The charging controller 45 is also connected to the MCU intelligent computing controller 41, and has the function of preventing voltage overshoot through mutual communication control. In the specific production and application, if the charging controller 45 is connected to an internal circuit at a rear end of the charging port, the charging controller 45 may send notification information to the MCU intelligent computing controller 41 when detecting charging or artificial uncovering a protective cover of the charging port, and the MCU intelligent computing controller 41 may send an instruction to control the voltage converter 44 to stop inverting the voltage, and control the charging controller 45 to release the circuit connection with the charging port to prevent charging conflict. When the vehicle is fully charged, the charging controller 45 may notify the MCU intelligent computing controller 41 to stop solar electricity generation and charging. When the artificial external charging exits and the conditions are met, the connection with the internal circuit at the rear end of the charging port is restored, and the solar charging mode is restored.

The solar panel 1 fixed on the roof and the movable solar panel 2 may preferably combine the voltages obtained by electricity generation in parallel, and the obtained output voltage is connected and input to the voltage converter 44 of the intelligent voltage conversion and control module 4. An output voltage of the voltage converter 44 passes through the charging controller, and a voltage output terminal of the charging controller is used as the voltage output terminal b of the intelligent voltage conversion and control module 4 to charge the power battery 53 of the electric vehicle.

Figure 9:
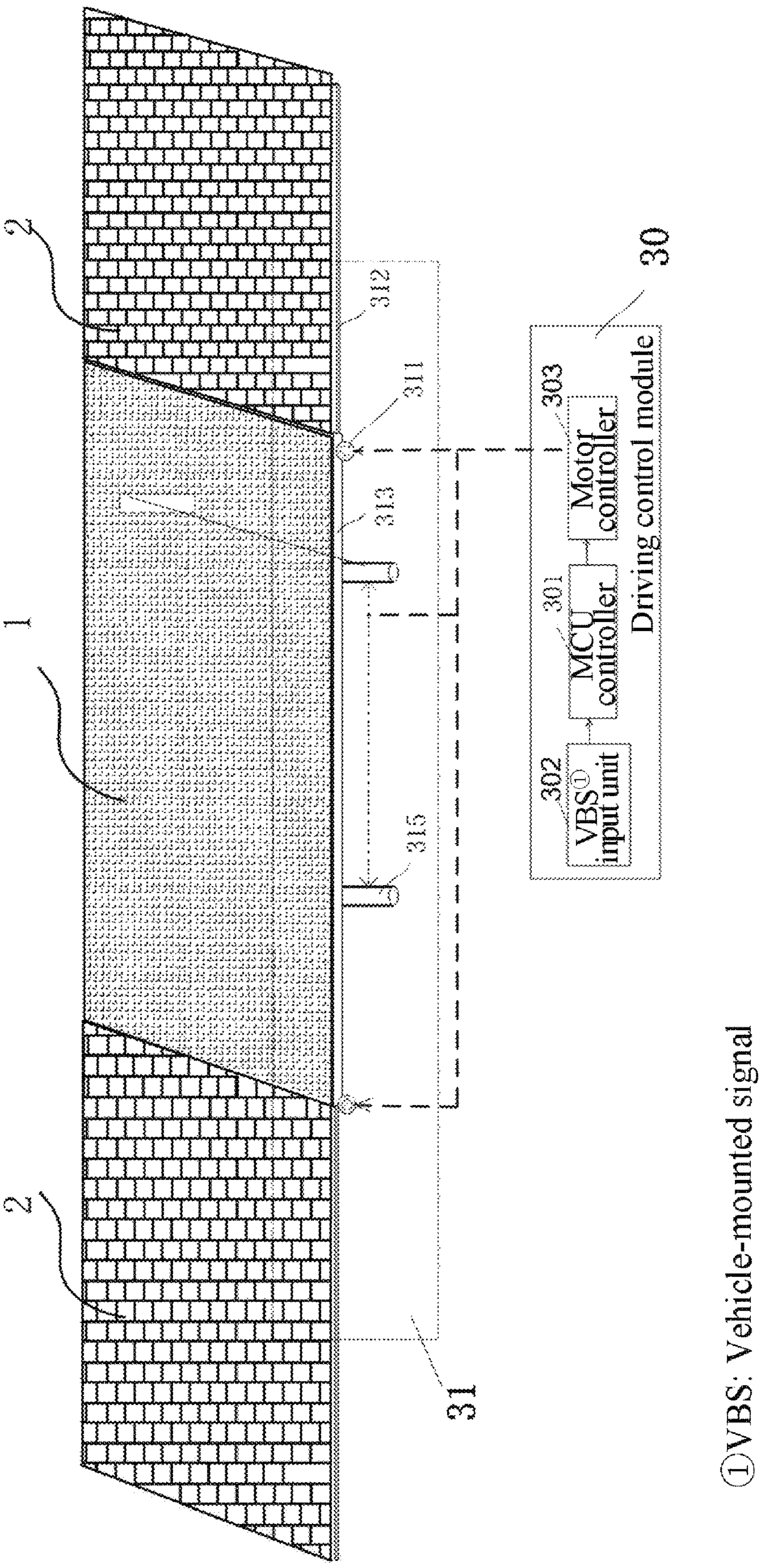
FIG. 9 is a schematic diagram of an installation structure of a telescopic supporting rod and a fixed solar panel in the present invention.
Figure 10:
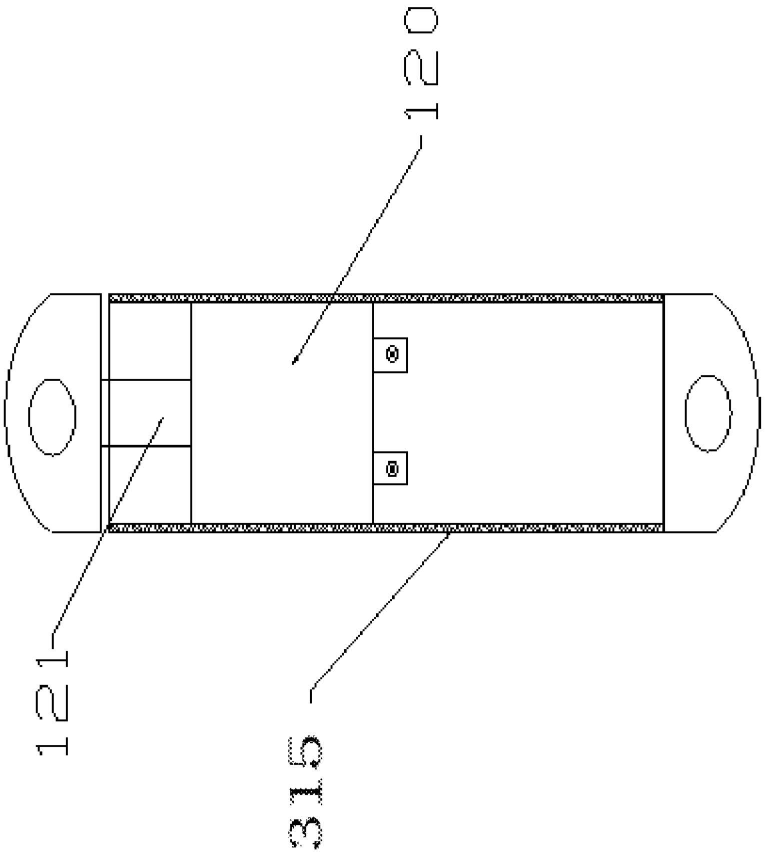
FIG. 10 is an enlarged and internal structure diagram of the telescopic supporting rod in the present invention.

As shown in FIG. 9 and FIG. 10, in the electric vehicle charging system capable of generating electricity by solar energy, the solar panel state control device 3 may further be added with a telescopic supporting rod 315. One end of the telescopic supporting rod 315 is fixed on the roof, and the other end of the telescopic supporting rod is hinged with a bottom portion of the fixed solar panel 1. Three telescopic supporting rods 315 are provided, and form a triangular structure with fixed supporting points of the fixed solar panel. A supporting rod motor 120 and a screw rod 121 are arranged in the telescopic supporting rod 315, one end of the screw rod 121 is connected with the supporting rod motor 120, and the other end of the screw rod 121 is hinged with the bottom portion of the fixed solar panel 1. The supporting rod motor 120 is driven by the motor controller, and the fixed solar panel 1 is mounted on the roof through the telescopic supporting rod 315. After the above structure is adopted, the solar panel state control device controls the expansion and contraction of the supporting rods through the motor controller, adjusts heights of the three supporting rods, and adjusts the three supporting points to change a plane angle of the solar panel. Meanwhile, the intelligent voltage conversion and control module calculates different powers in real time, and stops changing the angle when the solar panel gets the maximum capacity. Indifferent set time periods, according to the above method, a surface of the solar panel is nearly perpendicular to the solar ray, and a larger and more effective illumination receiving area can be obtained under different ray angle directions.

Figure 3:
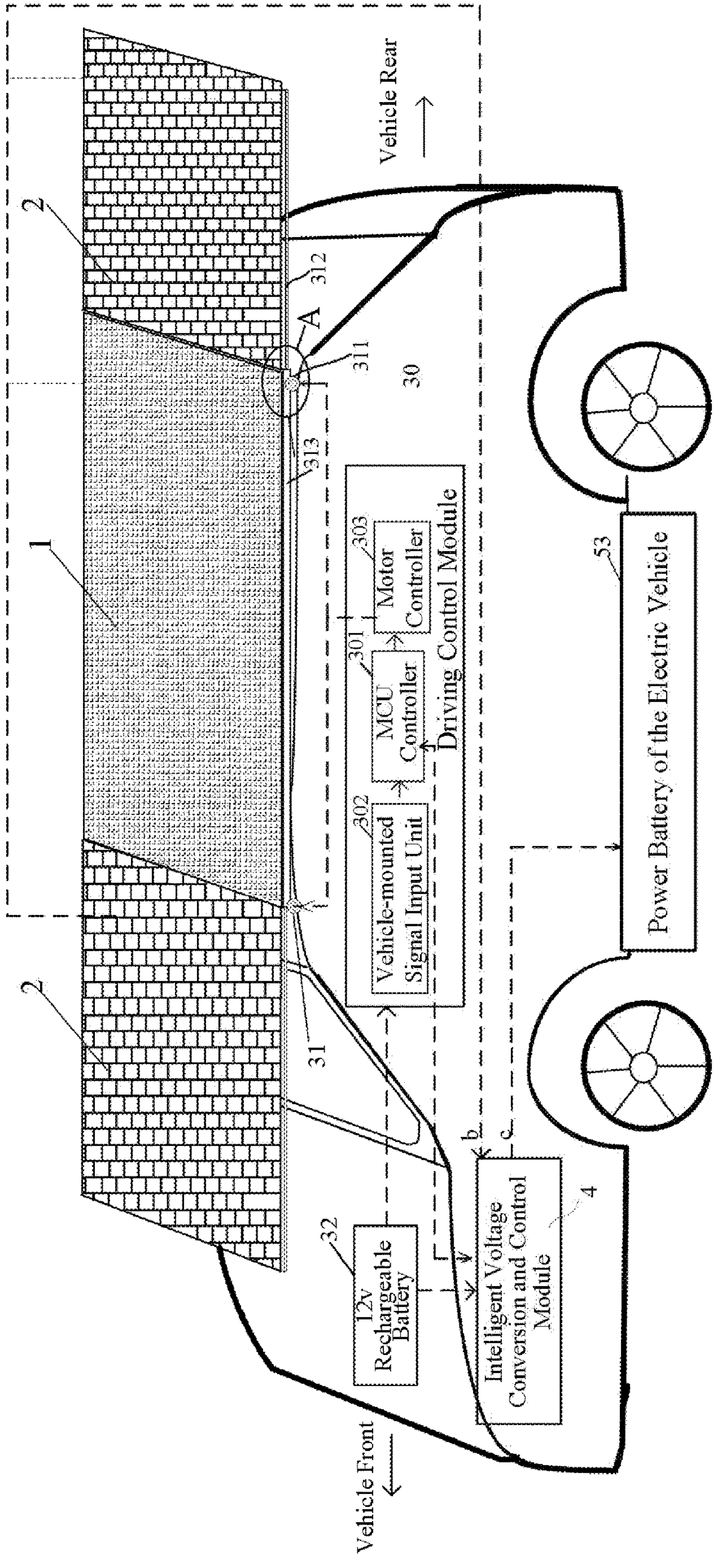
FIG. 3 is a schematic structural diagram of a second embodiment of the present invention.
Figure 4:
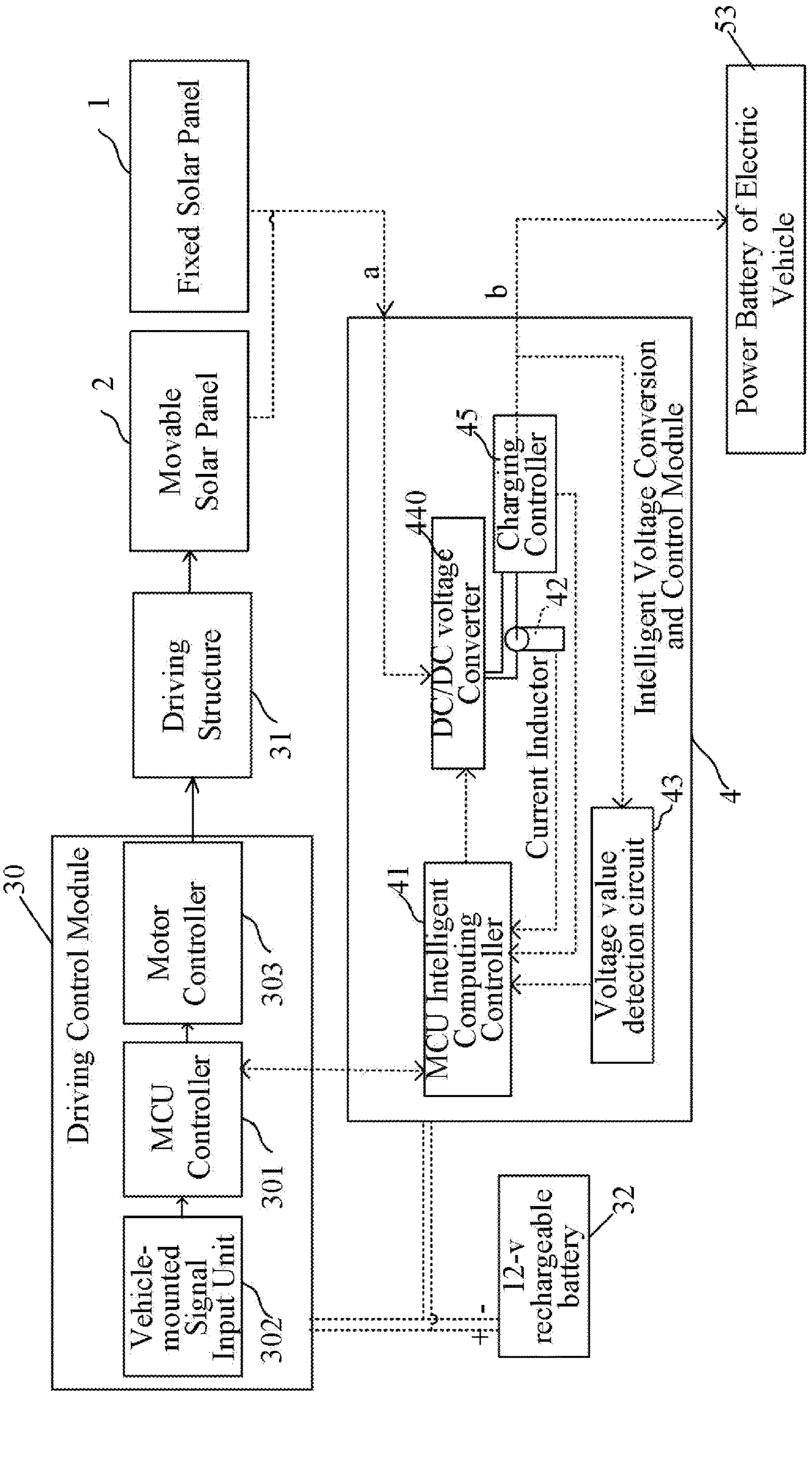
FIG. 4 is a principle topology schematic diagram of the second embodiment of the present invention.
Figure 5:
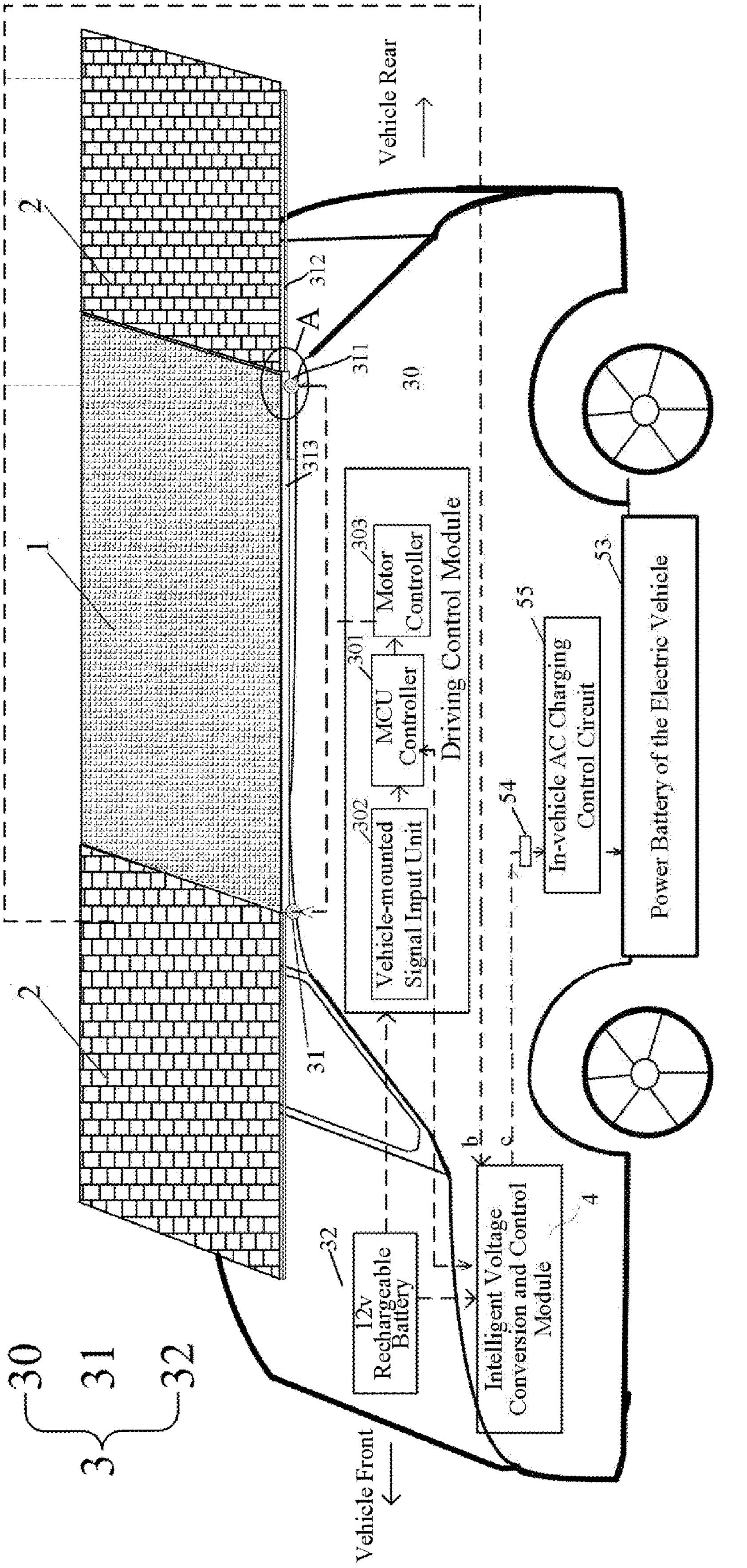
FIG. 5 is a schematic structural diagram of a third embodiment of the present invention.
Figure 6:
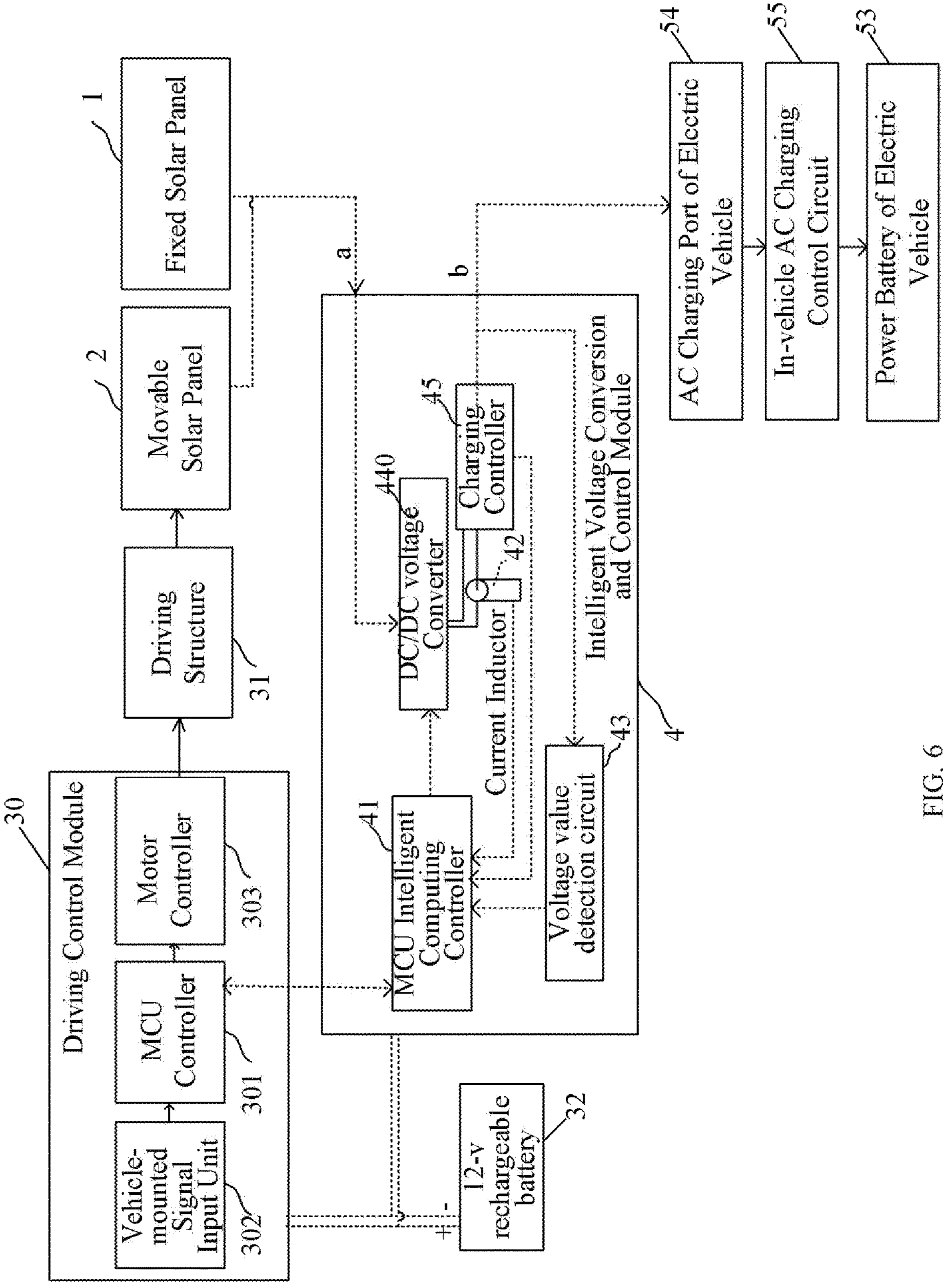
FIG. 6 is a principle topology schematic diagram of the third embodiment of the present invention.
Figure 7:
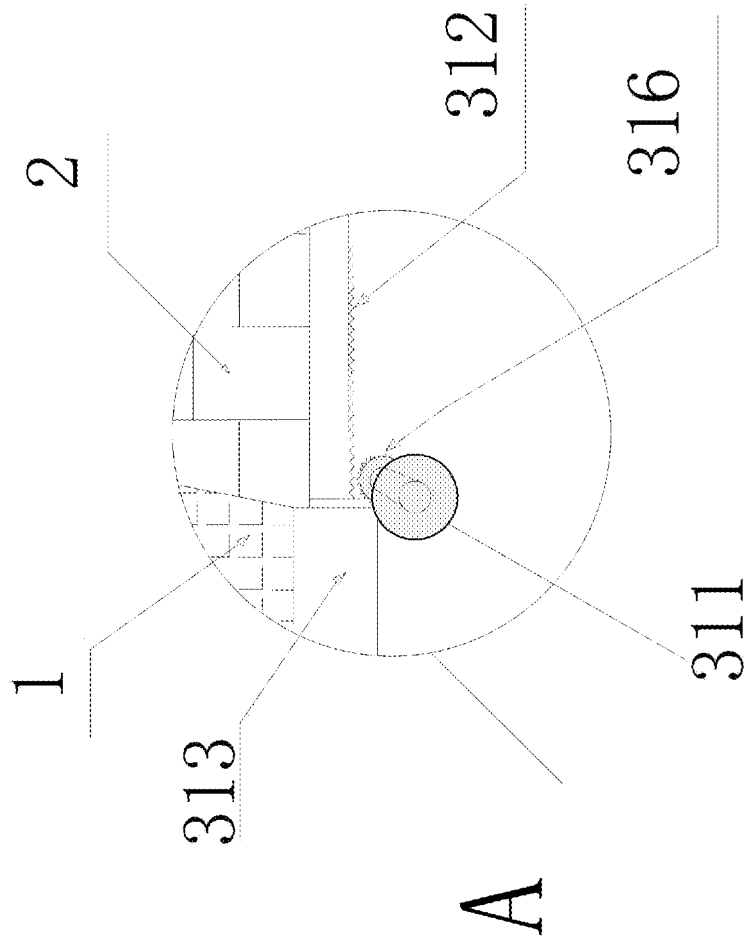
FIG. 7 and FIG. 8 are enlarged drawings of part A in FIG. 1, FIG. 3 and FIG. 5 of the present invention.
Figure 13:
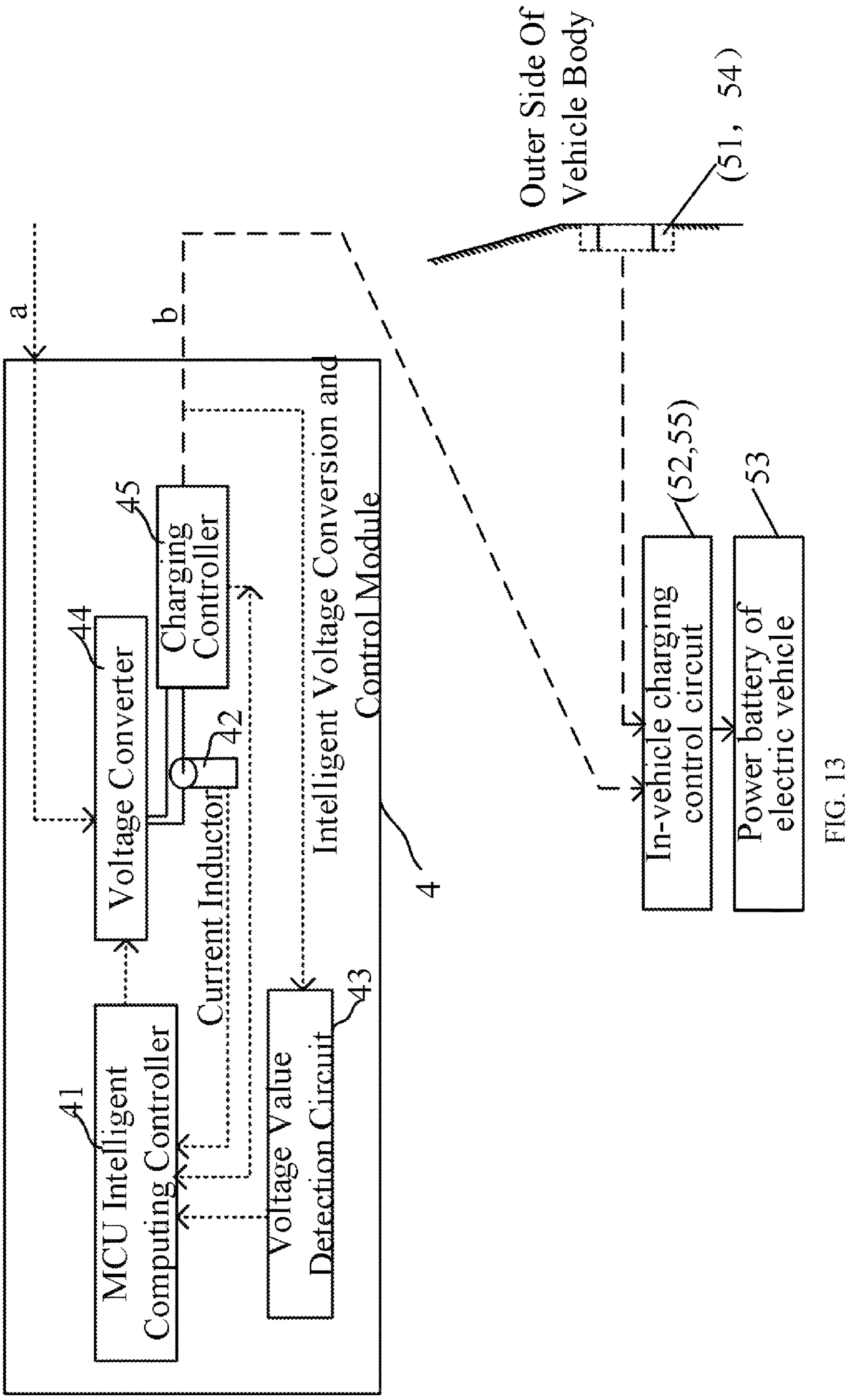

The description of the above structures refers to the specific implementation of the first embodiment. As shown in the structural drawing of FIG. 3 and the principle topology diagram of FIG. 4, a second embodiment of the present invention is different from the first embodiment in that the voltage output terminal of the intelligent voltage conversion and control module is connected to the cathode and/or the cathode of the power battery of the electric vehicle. In the actual production and application, a principle structure of the embodiment shown in FIG. 4 is adopted. The charging controller 45 comprises an on off control function. A voltage output of the voltage converter 440 enters the charging controller 45, and a cathode and/or an anode in the output terminal b of the charging controller 45 is connected to the cathode and/or the anode of the power battery directly. As shown in FIG. 5 and FIG. 6, a third embodiment of the present invention is different from the first embodiment in that the voltage output terminal of the intelligent voltage conversion and control module 4 is connected to an AC charging port of the electric vehicle. During actual production and application, a principle structure of the embodiment shown in FIG. 6 is adopted. A DC/AC voltage converter 441 is used in the voltage converter, and the output voltage enters the charging controller 45. The charging controller 45 comprises the handshake communication and control functions according to the AC charging interface standard of the original vehicle. The output terminal b of the charging controller is connected with the AC charging port 54 of the electric vehicle, that is, the AC slow charging port. The connection mode is as follows: the structure shown in FIG. 11 and FIG. 12 is also adopted, or as shown in FIG. 13, the output terminal b is further connected to an in-vehicle AC charging control circuit module 55, and integrated into a whole. The charging controller and the connection mode are specifically customized and matched according to protocol standards and handshake control circuits of different electric vehicle manufacturers.

In actual production and application, the electric vehicle mentioned in the present invention comprises pure electric vehicles and gas-electric hybrid vehicles.

The descriptions above are merely preferable embodiments of the present invention, and it should be noted that those of ordinary skills in the art may make a plurality of improvements and decorations without departing from the technical principle of the present invention, and these improvements and decorations shall also be deemed as the protection scope of the present invention.

I claim:

1. An electric vehicle charging system capable of generating electricity by solar energy, comprising a fixed solar panel, a movable solar panel, a solar panel state control device, and an intelligent voltage conversion and control module, wherein the fixed solar panel is fixedly mounted on a roof, the movable solar panel is mounted on two sides of the fixed solar panel, and the solar panel state control device is connected to the intelligent voltage conversion and control module, is used for receiving a vehicle-mounted signal and a signal of the intelligent voltage conversion and control module, and controls a stretched or contracted state of the movable solar panel, output voltages of the fixed solar panel and the movable solar panel are connected in parallel, and the output voltage obtained by the parallel connection is connected to the intelligent voltage conversion and control module, a voltage output terminal of the intelligent voltage conversion and control module is connected to a charging port of the electric vehicle or a power battery of the electric vehicle;

wherein the intelligent voltage conversion and control module is configured for controlling the solar panel to generate a maximum conversion rate and a maximum charging power under different light intensities in different time periods, wherein the intelligent voltage conversion and control module is docked with the electric vehicle and is configured to control charging and monitor a charging process of the electric vehicle; wherein, the intelligent voltage conversion and control module comprises a MCU intelligent computing controller, a current inductor, a voltage value detection circuit, a voltage converter and a charging controller, the current inductor and the voltage value detection circuit respectively detect a charging current and a charging voltage, and are connected to the MCU intelligent computing controller, the MCU intelligent computing controller is connected to the voltage converter, an output of the voltage converter is linked with the charging controller, and the MCU intelligent computing controller controls the voltage converter to convert and generate different voltages under the same light intensity in the same time period, calculates and memorizes different charging powers and parameters according to a returned voltage and a returned current, selects a parameter corresponding to the maximum power to control an output voltage of the voltage converter, and charges the electric vehicle through the charging controller; the charging controller is a charging controller having handshake communication and control functions according to an interface standard of an original vehicle charging socket, an input terminal of the charging controller is connected to an output terminal of the voltage converter, and an output terminal of the charging controller is connected to an original DC charging port of the electric vehicle, or is connected to a cathode or an anode of a power battery, or is connected to an alternating current charging port of the electric vehicle to charge the electric vehicle; and the charging controller is also connected to the MCU intelligent computing controller, and the MCU intelligent computing controller controls the charging controller to start or stop charging.

2. The electric vehicle charging system capable of generating electricity by solar energy according to claim 1, wherein the voltage converter is a controllable DC/DC voltage converter or DC/AC voltage converter, is controlled by the MCU intelligent computing controller, and is capable of outputting a continuously adjustable voltage.

3. The electric vehicle charging system capable of generating electricity by solar energy according to claim 1, wherein the solar panel state control device comprises a driving structure driving the movable solar panel to stretch, contract and translate, a driving control module and a low-voltage 12-v rechargeable battery, the driving structure is connected to the driving control module, the driving structure is mounted at a bottom portion of the fixed solar panel, and the 12-v rechargeable battery is connected to the driving control module and the intelligent voltage conversion and control module respectively, and provides a power supply needed for working.

4. The electric vehicle charging system capable of generating electricity by solar energy according to claim 3, wherein the driving control module comprises a vehicle-mounted signal input unit, a MCU controller and a motor controller, the MCU controller is connected to the vehicle-mounted signal input unit, and is used for receiving a signal instruction of the vehicle related to charging, the MCU controller is connected to the MCU intelligent computing controller, and is used for receiving charging state information, and the motor controller is connected to the MCU controller and the driving structure respectively.

5. The electric vehicle charging system capable of generating electricity by solar energy according to claim 3, wherein the driving structure comprises a motor provided with a gear, a trunking guide rail and a transmission rack, the transmission rack is fixed below the movable solar panel, the motor is mounted at two ends of the fixed solar panel, and is meshed with the transmission rack through the gear, and the motor rotates to drive the movable solar panel to translate along the trunking guide rail.

6. The electric vehicle charging system capable of generating electricity by solar energy according to claim 1, wherein the movable solar panel is divided into a front part and a rear part, each part is composed of a single-layer or multi-layer solar panel, and has a single-layer structure or a multi-layer superimposed structure, and voltage output terminals of the fixed solar panel and the movable solar panel are respectively connected with a diode in series to prevent a current from flowing backwardly.

7. An electric vehicle charging system capable of generating electricity by solar energy, comprising a fixed solar panel, a movable solar panel, a solar panel state control device, and an intelligent voltage conversion and control module, wherein the fixed solar panel is fixedly mounted on a roof, the movable solar panel is mounted on two sides of the fixed solar panel, and the solar panel state control device is connected to the intelligent voltage conversion and control module, is used for receiving a vehicle-mounted signal and a signal of the intelligent voltage conversion and control module, and controls a stretched or contracted state of the movable solar panel, output voltages of the fixed solar panel and the movable solar panel are connected in parallel, and the output voltage obtained by the parallel connection is connected to the intelligent voltage conversion and control module, a voltage output terminal of the intelligent voltage conversion and control module is connected to a charging port of the electric vehicle or a power battery of the electric vehicle;

wherein the intelligent voltage conversion and control module is configured for controlling the solar panel to generate a maximum conversion rate and a maximum charging power under different light intensities in different time periods, wherein the intelligent voltage conversion and control module is docked with the electric vehicle and is configured to control charging and monitor a charging process of the electric vehicle; wherein, the intelligent voltage conversion and control module comprises a MCU intelligent computing controller, a current inductor, a voltage value detection circuit, a voltage converter and a charging controller, the current inductor and the voltage value detection circuit respectively detect a charging current and a charging voltage, and are connected to the MCU intelligent computing controller, the MCU intelligent computing controller is connected to the voltage converter, an output of the voltage converter is linked with the charging controller, and the MCU intelligent computing controller controls the voltage converter to convert and generate different voltages under the same light intensity in the same time period, calculates and memorizes different charging powers and parameters according to a returned voltage and a returned current, selects a parameter corresponding to the maximum power to control an output voltage of the voltage converter, and charges the electric vehicle through the charging controller; the charging controller is a charging controller having handshake communication and control functions according to an interface standard of an original vehicle charging socket, an input terminal of the charging controller is connected to an output terminal of the voltage converter, and an output terminal of the charging controller is connected to an original DC charging port of the electric vehicle, or is connected to a cathode or an anode of a power battery, or is connected to an alternating current charging port of the electric vehicle to charge the electric vehicle; and the charging controller is also connected to the MCU intelligent computing controller, and the MCU intelligent computing controller controls the charging controller to start or stop charging;

wherein the solar panel state control device further comprises three telescopic supporting rods, wherein one end of each telescopic supporting rod is fixed to the roof, another end of the telescopic supporting rod is hinged with a bottom portion of the fixed solar panel, wherein the three telescopic supporting rods each connected to the motor controller, the motor controller is configured to change a height of a supporting point of the solar panel thus adjusting a planar angle of the solar panel by controlling the supporting rods to stretch and contract, so that the solar panel is nearly perpendicular to a solar ray.

* * * * *